United States Patent
Yamamoto

(10) Patent No.: US 6,229,275 B1
(45) Date of Patent: May 8, 2001

(54) SEMICONDUCTOR INTEGRATED CIRCUIT DEVICE FOR USE IN A DISK DRIVE

(75) Inventor: Minehisa Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/502,432

(22) Filed: Feb. 11, 2000

(30) Foreign Application Priority Data

Feb. 15, 1999 (JP) .................................................. 11-035215

(51) Int. Cl.[7] ........................................................ H02P 5/00
(52) U.S. Cl. .......................... 318/471; 318/634; 318/472; 369/44.35
(58) Field of Search ................................... 318/471, 445, 318/472, 634; 713/400; 369/44.35

(56) References Cited

U.S. PATENT DOCUMENTS

| | | | |
|---|---|---|---|
| 4,207,601 | * | 6/1980 | Desai et al. .............................. 360/78 |
| 4,519,086 | * | 5/1985 | Hull ...................................... 375/120 |
| 5,331,615 | * | 7/1994 | Yamada et al. ..................... 369/44.32 |
| 5,566,077 | * | 10/1996 | Kulakowski et al. ................ 364/480 |
| 5,594,603 | * | 1/1997 | Mori et al. ......................... 360/78.04 |
| 5,808,438 | * | 9/1998 | Jeffrey .................................. 318/634 |
| 5,930,110 | * | 7/1999 | Nishigaki et al. .................... 361/686 |
| 6,078,158 | * | 6/2000 | Heeren et al. ........................ 318/430 |
| 6,094,026 | * | 7/2000 | Cameron .............................. 318/471 |
| 6,134,667 | * | 10/2000 | Suzuki et al. ......................... 713/300 |

* cited by examiner

Primary Examiner—Robert E. Nappi
Assistant Examiner—Rita Leykin
(74) Attorney, Agent, or Firm—Arent Fox Kintner Plotkin & Kahn, PLLC

(57) ABSTRACT

A semiconductor integrated circuit device 1 for use in a disk drive has a temperature detection section 9 that detects the temperature inside the semiconductor integrated circuit device 1 to switch a signal TSD between high and low levels when a predetermined temperature is reached, and a delay circuit 11 that receives this signal TSD and a clock from a control section 10 to output signals TSD1 and TSD2. In this semiconductor integrated circuit device 1, when the temperature inside rises above $T^+$, a spindle motor driver section 7 is deactivated, and, a predetermined length of time thereafter, a stepping motor driver section 8 is deactivated; when the temperature inside drops below $T^-$, the stepping motor driver section 8 is activated, and, a predetermined length of time thereafter, the spindle motor driver section 7 is deactivated,

14 Claims, 4 Drawing Sheets

SEMICONDUCTOR INTEGRATED CIRCUIT DEVICE FOR USE IN A DISK DRIVE

BACKGROUND OF THE INVENTION

1. Field of the Invention

The present invention relates to a disk drive for recording data on and reproducing data from a recording medium such as an FD (flexible disk), CD (compact disk), or MO (magneto-optical disk), and in particular to a semiconductor integrated circuit device for use in such a disk drive to control the driving of a spindle motor and a stepping motor provided within the disk drive while detecting the temperature inside the disk drive.

2. Description of the Prior Art

FIG. 1 shows a disk drive having a head 2 for writing and reading signals to and from a recording medium 5 such as an FD or CD, a spindle motor 3 for rotating the medium 5, a stepping motor 4 for moving the head 2 radially across the medium 5, and a semiconductor integrated circuit device 1 designed for use in a disk drive to record data on and reproduce data from the medium 5 through the head 2 and to control the driving of the spindle motor 3 and the stepping motor 4.

FIG. 6 shows the internal configuration of a conventional semiconductor integrated circuit device designed for use in such a disk drive. The semiconductor integrated circuit device 1' for use in a disk drive (hereinafter referred to simply as the "semiconductor integrated circuit device 1'") shown in FIG. 6 has a read/write section 6 for writing and reading signals to and from the medium 5 (FIG. 1) through the head 2 (FIG. 1), a spindle motor driver section 7 for controlling the driving of the spindle motor 3 (FIG. 1), a stepping motor driver section 8 for controlling the driving of the stepping motor 4 (FIG. 1), temperature detection sections 9a and 9b for detecting the temperature inside the semiconductor integrated circuit device 1', and a control section 10 that exchanges signals with the individual blocks mentioned just above.

In this semiconductor integrated circuit device 1', the spindle motor 3 and the stepping motor 4 are driven in such a way that the head 2 is moved to a position specified by the control section 10 to allow writing or reading of a signal at that position on the medium 5. At this time, the spindle motor driver section 7 and the stepping motor driver section 8 operate concurrently, and thus the temperature inside the semiconductor integrated circuit device 1' rises most steeply. If this condition persists, and the temperature inside the semiconductor integrated circuit device 1' keeps rising, the semiconductor integrated circuit device 1' is in danger of malfunctioning or destruction. For this reason, it is essential to lower the temperature inside the semiconductor integrated circuit device 1' by stopping the operation of the spindle motor driver section 7 or the stepping motor driver section 8 when the temperature reaches a predetermined level.

To achieve this, when the temperature inside the semiconductor integrated circuit device 1' rises to $T1^+$ as shown at (a) in FIG. 7, a signal TSD1 that the temperature detection section 9a outputs to the control section 10 is turned to a high level as shown at (b) in FIG. 7 to request the spindle motor driver section 7 to be turned off. Thus, when the signal TSD1 is turned to a high level, the control section 10 controls the spindle motor driver section 7 to stop its operation. Thereafter, when the temperature inside the semiconductor integrated circuit device 1' rises further to $T2^+$, a signal TSD2 that the temperature detection section 9b outputs to the control section 10 is turned to a high level as shown at (c) in FIG. 7 to request the stepping motor driver section 8 to be turned off. Thus, when the signal TSD2 is turned to a high level, the control section 10 controls the stepping motor driver section 8 to stop its operation.

A while after the spindle motor driver section 7 and the stepping motor driver section 8 have been stopped in this way, the temperature inside the semiconductor integrated circuit device 1' starts dropping as shown at (a) in FIG. 7. When the temperature drops to $T2^-$, the signal TSD2 that the temperature detection section 9b outputs to the control section 10 is turned to a low level as shown at (c) in FIG. 7 to request the stepping motor driver section 8 to be activated. Thus, when the signal TSD2 is turned to a low level, the control section 10 controls the stepping motor driver section 8 to start its operation. Thereafter, when the temperature inside the semiconductor integrated circuit device 1' drops further to $T1^-$, the signal TSD1 that the temperature detection section 9a outputs to the control section 10 is turned to a low level as shown at (b) in FIG. 7 to request the spindle motor driver section 7 to be activated. Thus, when the signal TSD1 is turned to a low level, the control section 10 controls the spindle motor driver section 7 to start its operation.

In this way, when the temperature reaches a predetermined level, the spindle motor driver section 7 and the stepping motor driver section 8 are stopped to prevent malfunctioning or destruction of the semiconductor integrated circuit device 1' resulting from high temperature inside it.

As shown in FIG. 7, the timing with which the spindle motor driver section 7 and the stepping motor driver section 8 are turned on or off depends on the rate at which the temperature inside the semiconductor integrated circuit device 1' varies. Therefore, depending on the environment in which the semiconductor integrated circuit device 1' is used, the temperature inside it may vary at a very steep rate as shown in FIG. 8. In such a case, the signals TSD1 and TSD2 that the temperature detection sections 9a and 9b respectively output are turned from a high level to a low level or from a low level to a high level almost at the same time.

Turning the states of the signals TSD1 and TSD2 almost at the same time in this way results in the spindle motor driver section 7 and the stepping motor driver section 8 being turned on or off almost at the same time. As a result, a large current suddenly starts or stops flowing into the semiconductor integrated circuit device 1'. At such moments, in particular when a large current suddenly starts flowing in, the voltage supplied to the semiconductor integrated circuit device 1' may fluctuate and cause unstable operation thereof, leading even to destruction of the internal circuit thereof. Moreover, the temperature detection section for detecting the temperature at which the spindle motor driver section 7 is to be turned on or off and the temperature detection section for detecting the temperature at which the stepping motor driver section 8 is to be turned on or off need to be provided separately, like the temperature detection sections 9a and 9b, and this hinders the miniaturization of the chip size.

SUMMARY OF THE INVENTION

An object of the present invention is to provide a semiconductor integrated circuit device for use in a disk drive that permits a spindle motor driver section and a stepping motor driver section to be turned on or off with an interval longer than a predetermined length of time after each other irrespective of the rate at which the temperature inside the semiconductor integrated circuit device varies.

To achieve the above object, according to the present invention, a semiconductor integrated circuit device for use in a disk drive is provided with: a first motor driver section for driving a first motor; a second motor driver section for driving a second motor; a temperature detection section for detecting the temperature inside the semiconductor integrated circuit device to output a detection signal when a predetermined temperature is reached; a delay signal generator for delaying the detection signal from the temperature detection section by predetermined lengths of time to output first and second delay signals; and a controller for performing control in such a way that, when the temperature inside the semiconductor integrated circuit device rises above a first temperature, first the first motor driver section is deactivated in accordance with the first delay signal and then the second motor driver section is deactivated in accordance with the second delay signal and that, when the temperature inside the semiconductor integrated circuit device drops below a second temperature, first the second motor driver section is activated in accordance with the second delay signal and then the first motor driver section is activated in accordance with the first delay signal.

In this semiconductor integrated circuit device for use in a disk drive, in accordance with the first and second delay signals output from the delay signal generator, when the temperature inside rises above the first temperature, first the first motor driver section is deactivated and then the second motor driver section is deactivated. After the first and second motor driver sections have been deactivated in this way, when the temperature inside drops below the second temperature, first the second motor driver section is activated and then the first motor driver section is activated. In this way, the first and second motor driver sections are prevented from being activated or deactivated at the same time.

Moreover, according to the present invention, a disk drive apparatus incorporates a semiconductor integrated circuit device as described above.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
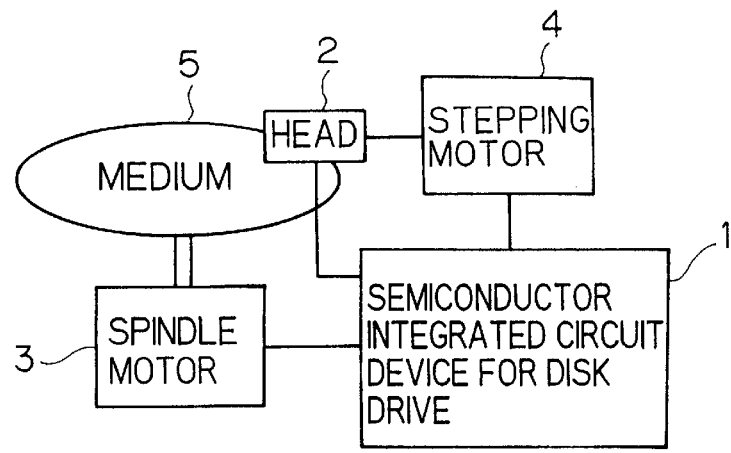
FIG. 1 is a block diagram showing the overall configuration of a disk drive.
Figure 2:
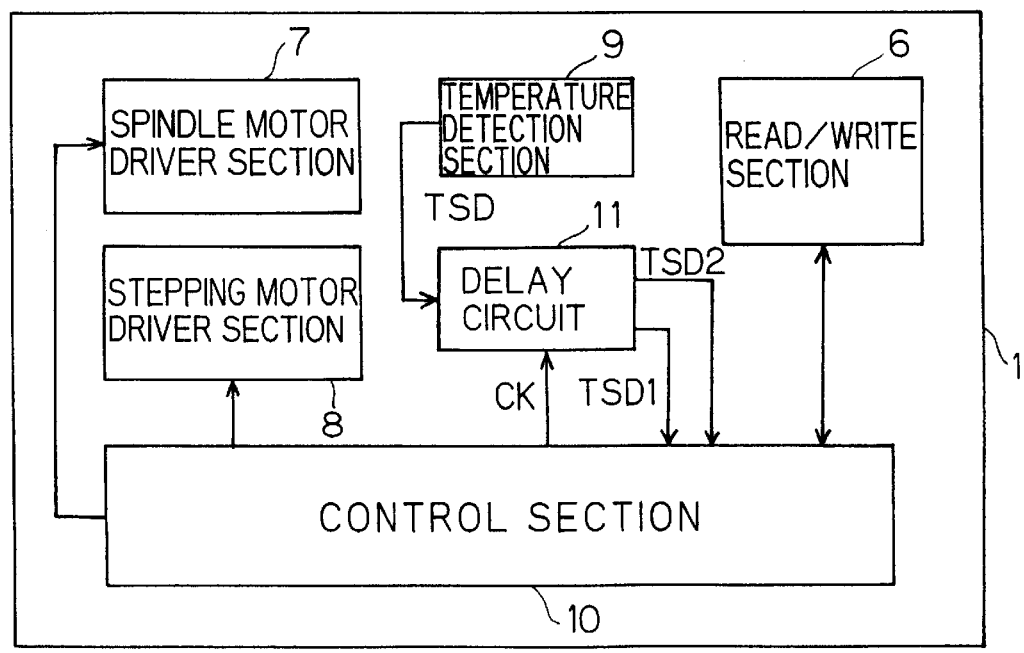
FIG. 2 is a block diagram showing the internal configuration of the semiconductor integrated circuit device for use in a disk drive according to the invention.
Figure 6:
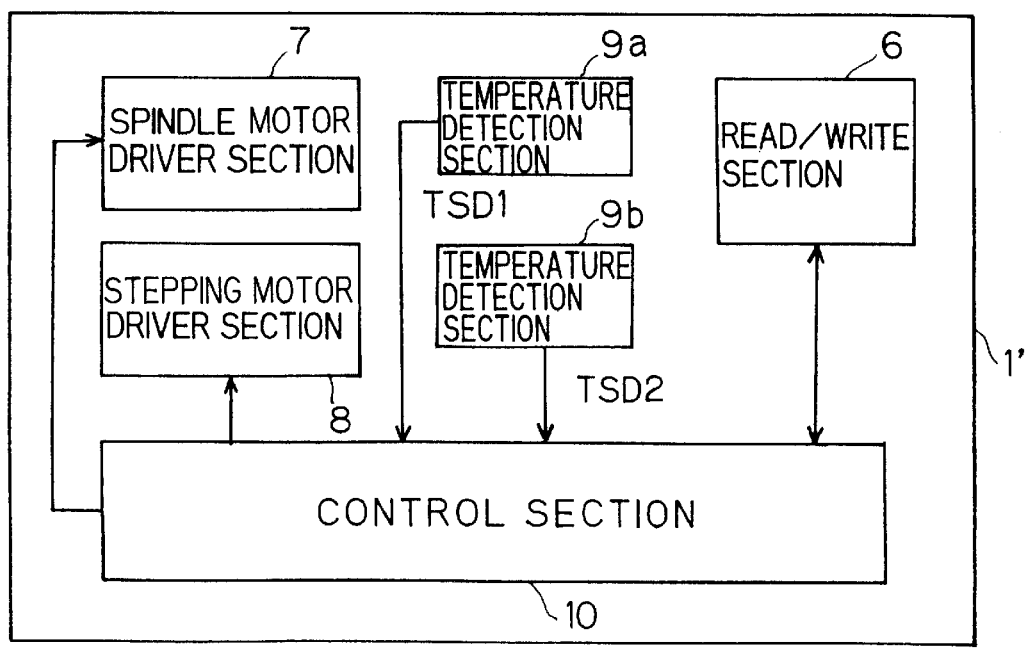
FIG. 6 is a block diagram showing the internal configuration of a conventional semiconductor integrated circuit device for use in a disk drive.

Hereinafter, an embodiment of the present invention will be described with reference to the accompanying drawings. A disk drive embodying the invention is configured, just like a conventional disk drive, as shown in FIG. 1. However, here, the disk drive shown in FIG. 1 is provided with a semiconductor integrated circuit device for use in a disk drive that is internally configured as shown in FIG. 2, which is a block diagram thereof. It is to be noted that such elements of the semiconductor integrated circuit device 1 for use in a disk drive shown in FIG. 2 as serve the same purposes as in the semiconductor integrated circuit device 1'for use in a disk drive shown in FIG. 6 are identified with the same reference numerals and symbols, and their descriptions will not be repeated.

The semiconductor integrated circuit device 1 for use in a disk drive (hereinafter referred to simply as the "semiconductor integrated circuit device 1") shown in FIG. 2 has a temperature detection section 9 for detecting the temperature inside the semiconductor integrated circuit device 1, a delay circuit 11 for feeding signals TSD1 and TSD2 to a control section 10 in accordance with a signal TSD output from the temperature detection section 9 in order to turn on or off a spindle motor driver section 7 and a stepping motor driver section 8 respectively, a read/write section 6, a spindle motor driver section 7, a stepping motor driver section 8, and a control section 10.

Figure 3:
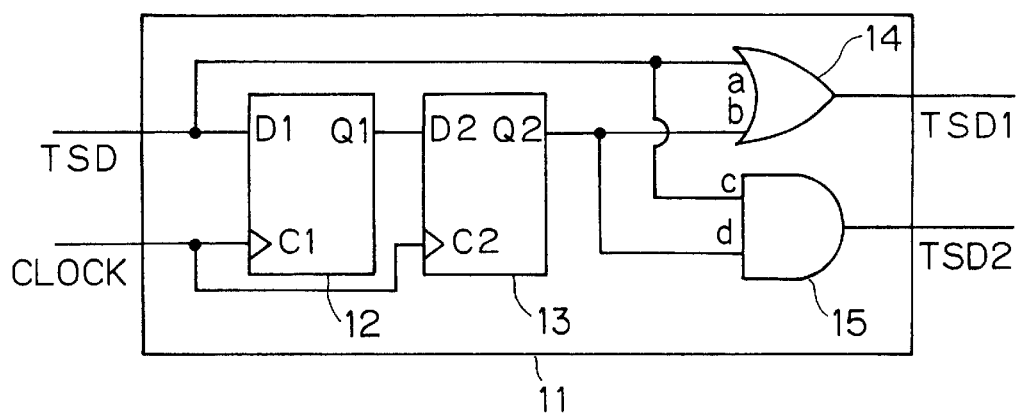
FIG. 3 is a logic circuit diagram showing the internal configuration of the delay circuit provided within the semiconductor integrated circuit device for use in a disk drive shown in FIG. 2.
Figure 4:
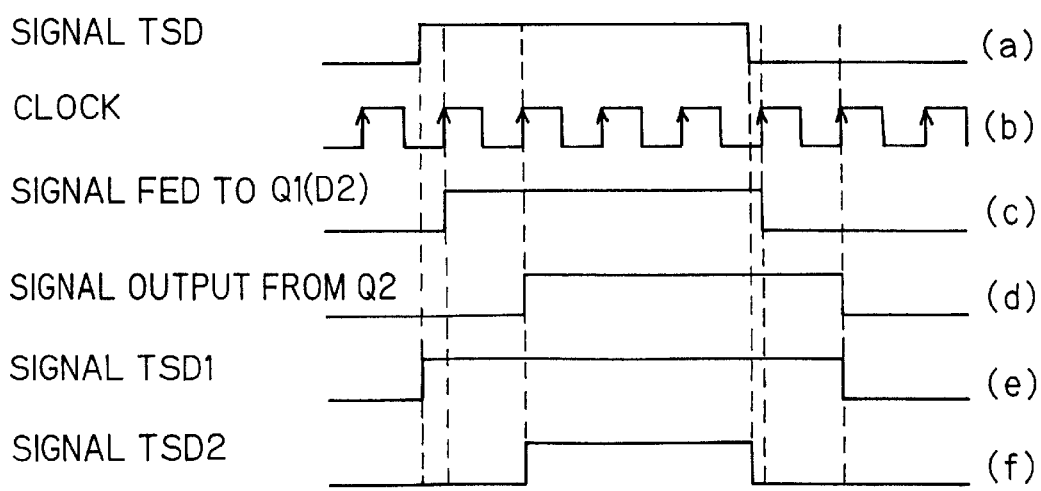
FIG. 4 is a time chart showing how the delay circuit shown in FIG. 3 operates.

Now, the delay circuit 11 provided in this semiconductor integrated circuit device 1 will be described with reference to FIGS. 3 and 4. FIG. 3 is a logic circuit diagram showing the internal configuration of the delay circuit 11, and FIG. 4 is a timing chart showing how the delay circuit 11 operates. The delay circuit 11 shown in FIG. 3 has D flip-flops (hereinafter "DFFs") 12 and 13 that operate in synchronism with a clock CK they receive at their respective clock terminals C1 and C2 from the control section 10, and an OR circuit 14 and an AND circuit 15 that each receive the signal TSD from the temperature detection section 9 and a signal from the output terminal Q2 of the DFF 13. The output terminal Q1 of the DFF 12 is connected to the input terminal D2 of the DFF 13. Thus, the DFFs 12 and 13 constitute a counter circuit that outputs a signal fed thereto with a delay corresponding to two clock pulses.

The delay circuit 11, configured as described above, operates as follows. When the signal TSD from the temperature detection section 9 turns from a low level to a high level as shown at (a) in FIG. 4, the signal fed to the input terminal D1 of the DFF 12, to the terminal a of the OR circuit 14, and to the terminal c of the AND circuit 15 turns to a high level. After the signal TSD has turned to a high level in this way, when one clock pulse is fed to the delay circuit 11 as shown at (b) in FIG. 4, the signal appearing at the output terminal Q1 of the DFF 12 turns to a high level as shown at (c) in FIG. 4, and this high-level signal is fed to the input terminal D2 of the DFF 13. Thereafter, when one more clock pulse is fed to the delay circuit 11, the signal appearing at the output terminal Q2 of the DFF 13 turns to a high level as shown at (d) in FIG. 4.

Meanwhile, since the DFFs 12 and 13 operate as described above after the signal TSD has turned to a high level, the signal fed to the terminal b of the OR circuit 14 and to the terminal d of the AND circuit 15 is kept at a low level after the signal TSD has turned to a high level until two clock pulses are fed to the delay circuit 11. During this period, the signal TSD fed to the terminal a of the OR circuit 14 remains at a high level, and thus the signal TSD1, which the OR circuit 14 outputs to the control section 10, is kept at a high level as shown at (e) in FIG. 4; by contrast, the signal TSD2, which the AND circuit 15 outputs to the control section 10, is kept at a low level as shown at (f) in FIG. 4. Thereafter, when two clock pulses are fed to the delay circuit 11, the signal fed to the terminal d of the AND circuit 15 turns to a high level, and thus the signal TSD2 turns to a high level as shown at (f) in FIG. 4.

On the other hand, when the signal TSD from the temperature detection section 9 turns from a high level to a low level as shown at (a) in FIG. 4, the signal fed to the input terminal D1 of the DFF 12, to the terminal a of the OR circuit 14, and to the terminal c of the AND circuit 15 turns to a low level. After the signal TSD has turned to a low level in this way, when one clock pulse is fed to the delay circuit 11 as shown at (b) in FIG. 4, the signal appearing at the output terminal Q1 of the DFF 12 turns to a low level as shown at (c) in FIG. 4, and this low-level signal is fed to the input terminal D2 of the DFF 13. Thereafter, when one more clock pulse is fed to the delay circuit 11, the signal appearing at the output terminal Q2 of the DFF 13 turns to a low level as shown at (d) in FIG. 4.

Meanwhile, since the DFFs 12 and 13 operate as described above after the signal TSD has turned to a low level, the signal fed to the terminal b of the OR circuit 14 and to the terminal d of the AND circuit 15 is kept at a high level after the signal TSD has turned to a low level until two clock pulses are fed to the delay circuit 11. During this period, the signal TSD fed to the terminal c of the AND circuit 15 remains at a low level, and thus the signal TSD2, which the AND circuit 15 outputs to the control section 10, is kept at a low level as shown at (f) in FIG. 4; by contrast, the signal TSD1, which the OR circuit 14 outputs to the control section 10, is kept at a high level as shown at (e) in FIG. 4. Thereafter, when two clock pulses are fed to the delay circuit 11, the signal fed to the terminal b of the OR circuit 14 turns to a low level, and thus the signal TSD1 turns to a low level as shown at (e) in FIG. 4.

In this semiconductor integrated circuit device 1 incorporating the delay circuit 11 as described above, just as in a conventional one, the spindle motor 3 (FIG. 1) and the stepping motor 4 (FIG. 1) are driven in such a way that the head 2 (FIG. 1) is moved to a position specified by the control section 10 to allow writing or reading of a signal at that position on the medium 5 (FIG. 1). Here, when the spindle motor driver section 7 and the stepping motor driver section 8 operate concurrently, the temperature inside the semiconductor integrated circuit device 1 rises most steeply.

Figure 5:
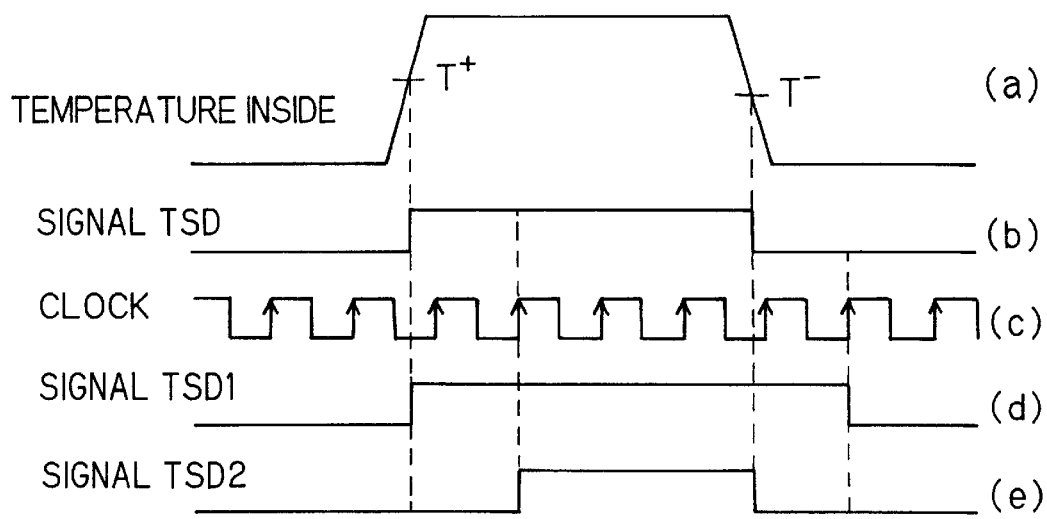
FIG. 5 is a time chart showing how the semiconductor integrated circuit device for use in a disk drive shown in FIG. 2 operates.

Now, suppose that the spindle motor driver section 7 and the stepping motor driver section 8 operate concurrently and, as a result, the temperature inside the semiconductor integrated circuit device 1 rises as shown at (a) in FIG. 5. When the temperature rises above $T^+$, the signal TSD output from the temperature detection section 9 turns to a high level as shown at (b) in FIG. 5. When the signal TSD turns to a high level, the signal TSD1 output from the delay circuit 11 turns to a high level as shown at (d) in FIG. 5. When this signal TSD1, now at a high level, is fed to the control section 10, the control section 10 controls the spindle motor driver section 7 to deactivate it.

Thereafter, when two clock pulses are fed from the control section 10 to the delay circuit 11 as shown at (c) in FIG. 5, the signal TSD2 output from the delay circuit 11 turns to a high level as shown at (e) in FIG. 5. When this signal TSD2, now at a high level, is fed to the control section 10, the control section 10 controls the stepping motor driver section 8 to deactivate it.

Next, suppose that the spindle motor driver section 7 and the stepping motor driver section 8 have been deactivated and, as a result, the temperature inside the semiconductor integrated circuit device 1 drops as shown at (a) in FIG. 5. When the temperature drops below $T^-$, the signal TSD output from the temperature detection section 9 turns to a low level as shown at (b) in FIG. 5. When the signal TSD turns to a low level, the signal TSD2 output from the delay circuit 11 turns to a low level as shown at (e) in FIG. 5. When this signal TSD2, now at a low level, is fed to the control section 10, the control section 10 controls the stepping motor driver section 8 to activate it.

Figure 7:
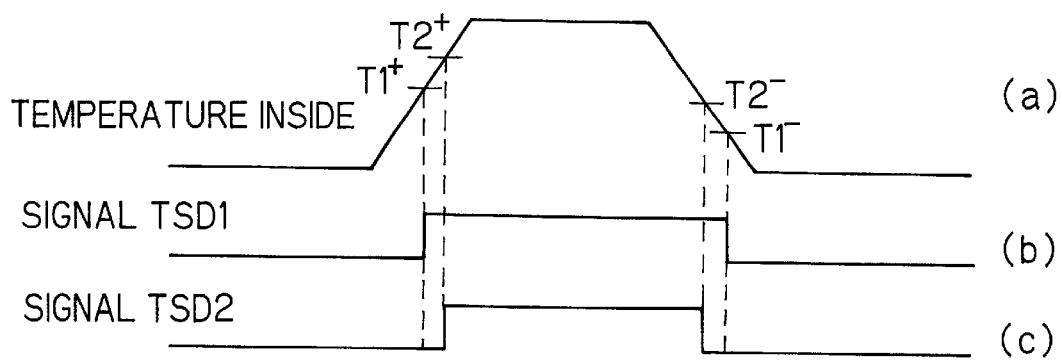
FIG. 7 is a time chart showing an example of how the conventional semiconductor integrated circuit device for use in a disk drive shown in FIG. 6 operates.
Figure 8:
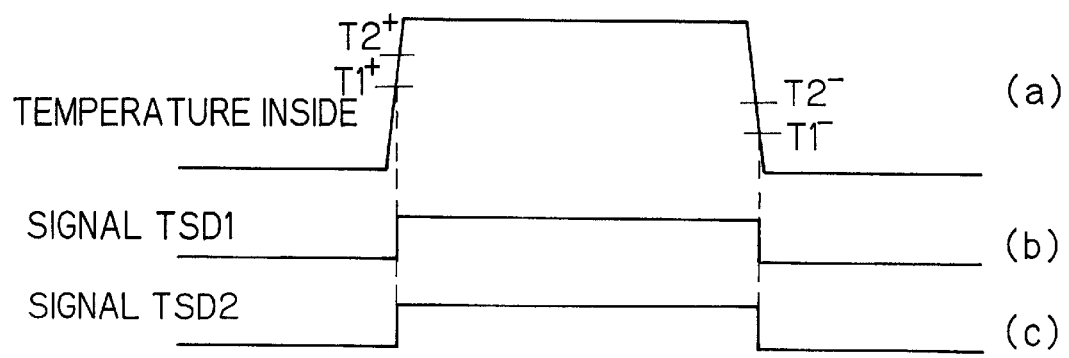
FIG. 8 is a time chart showing another example of how the conventional semiconductor integrated circuit device for use in a disk drive shown in FIG. 6 operates.

Thereafter, when two clock pulses are fed from the control section 10 to the delay circuit 11 as shown at (c) in FIG. 5, the signal TSD1 output from the delay circuit 11 turns to a low level as shown at (d) in FIG. 5. When this signal TSD1, now at a low level, is fed to the control section 10, the control section 10 controls the spindle motor driver section 7 to activate it. The operation thus far described makes it possible to secure a delay time of approximately 1.0 to 2.0 microseconds without fail when the spindle motor driver section 7 and the stepping motor driver section 8 are turned on or off. It is to be noted that the temperatures $T^+$ and $T^-$ here correspond respectively to the temperatures $T1^+$ and $T1^-$ shown in FIG. 7.

Although the delay circuit 11 is realized as a logic circuit configured as shown in FIG. 3 in this embodiment, it may be realized as a logic circuit configured in any other manner. The delay time can be varied to suit the scale of a given semiconductor integrated circuit device by varying the frequency of the clock or by modifying the configuration of the delay circuit.

In a semiconductor integrated circuit device for use in a disk drive according to the present invention, the provision of a delay circuit makes it possible to secure a delay time without fail irrespective of the rate at which the temperature inside the semiconductor integrated circuit device varies when a spindle motor driver section and a stepping motor driver section are turned on or off. As a result, it never occurs that the spindle motor driver section and the stepping motor driver section are turned on or off at the same time, and thus it never occurs that a large current suddenly starts or stops flowing. This helps prevent such a large current from causing unstable operation of the semiconductor integrated circuit device, which may lead to malfunctioning or even destruction thereof.

Moreover, it is not necessary to provide temperature detection sections separately to detect individually the temperatures at which the spindle motor driver section and the stepping motor driver section are to be turned on or off. This helps make the chip area of the semiconductor integrated circuit device smaller, because such temperature detection sections each require an area of approximately 200×100 $\mu m^2$ when laid out on the chip of the semiconductor integrated circuit device.

What is claimed is:

1. A semiconductor integrated circuit device for use in a disk drive, comprising:
   a first motor driver section for driving a first motor;
   a second motor driver section for driving a second motor;
   a temperature detection section for detecting temperature inside the semiconductor integrated circuit device to output a detection signal when a predetermined temperature is reached;

a delay signal generator for delaying the detection signal from the temperature detection section by predetermined lengths of time to output first and second delay signals; and a controller for performing control in such a way that, when the temperature inside the semiconductor integrated circuit device rises above a first temperature, first the first motor driver section is deactivated in accordance with the first delay signal and then the second motor driver section is deactivated in accordance with the second delay signal and that, when the temperature inside the semiconductor integrated circuit device drops below a second temperature, first the second motor driver section is activated in accordance with the second delay signal and then the first motor driver section is activated in accordance with the first delay signal.

2. A semiconductor integrated circuit device for use in a disk drive as claimed in claim 1, wherein the first and second delay signals are each a binary signal that is either at a first level or at a second level at a time, and wherein, when the first delay signal is at the first level, the first motor driver section is kept deactivated, and, when the second delay signal is at the first level, the second motor driver section is kept deactivated.

3. A semiconductor integrated circuit device for use in a disk drive as claimed in claim 2, wherein the detection signal is a binary signal that is either at a first level or at a second level at a time, and wherein, when the temperature inside the semiconductor integrated circuit device rises above the first temperature, the detection signal is switched from the second level to the first level, and, when the temperature inside the semiconductor integrated circuit device drops below the second temperature, the detection signal is switched from the first level to the second level.

4. A semiconductor integrated circuit device for use in a disk drive as claimed in claim 1, wherein the delay signal generator comprises:

a delay circuit for delaying the detection signal to produce a third delay signal;

a first logic gate circuit for producing the first delay signal from the detection signal and the third delay signal; and a second logic gate circuit for producing the second delay signal from the detection signal and the third delay signal.

5. A semiconductor integrated circuit device for use in a disk drive as claimed in claim 4, wherein the first and second delay signals are each a binary signal that is either at a first level or at a second level at a time, and wherein, when the first delay signal is at the first level, the first motor driver section is kept deactivated, and, when the second delay signal is at the first level, the second motor driver section is kept deactivated.

6. A semiconductor integrated circuit device for use in a disk drive as claimed in claim 5, wherein the detection signal and the third delay signal are each a binary signal that is either at a first level or at a second level at a time, and wherein, when the temperature inside the semiconductor integrated circuit device rises above the first temperature, the detection signal is switched from the second level to the first level, and, when the temperature inside the semiconductor integrated circuit device drops below the second temperature, the detection signal is switched from the first level to the second level.

7. A semiconductor integrated circuit device for use in a disk drive as claimed in claim 6, wherein the delay circuit comprises a plurality of stages of flip-flops, and wherein, when one of the detection signal and the third delay signal is at a high level, the first logic gate circuit keeps the first delay signal at the first level, and, when both of the detection signal and the third delay signal are at the first level, the second logic gate circuit keeps the first delay signal at the first level.

8. A disk drive apparatus having a semiconductor integrated circuit device, said semiconductor integrated circuit device comprising:

a first motor driver section for driving a spindle motor;

a second motor driver section for driving a stepping motor;

a temperature detection section for detecting temperature inside the semiconductor integrated circuit device to output a detection signal when a predetermined temperature is reached;

a delay signal generator for delaying the detection signal from the temperature detection section by predetermined lengths of time to output first and second delay signals; and a controller for performing control in such a way that, when the temperature inside the semiconductor integrated circuit device rises above a first temperature, first the first motor driver section is deactivated in accordance with the first delay signal and then the second motor driver section is deactivated in accordance with the second delay signal and that, when the temperature inside the semiconductor integrated circuit device drops below a second temperature, first the second motor driver section is activated in accordance with the second delay signal and then the first motor driver section is activated in accordance with the first delay signal.

9. A disk drive apparatus as claimed in claim 8, wherein the first and second delay signals are each a binary signal that is either at a first level or at a second level at a time, and wherein, when the first delay signal is at the first level, the first motor driver section is kept deactivated, and, when the second delay signal is at the first level, the second motor driver section is kept deactivated.

10. A disk drive apparatus as claimed in claim 9, wherein the detection signal is a binary signal that is either at a first level or at a second level at a time, and wherein, when the temperature inside the semiconductor integrated circuit device rises above the first temperature, the detection signal is switched from the second level to the first level, and, when the temperature inside the semiconductor integrated circuit device drops below the second temperature, the detection signal is switched from the first level to the second level.

11. A disk drive apparatus as claimed in claim 8, wherein the delay signal generator comprises:

a delay circuit for delaying the detection signal to produce a third delay signal;

a first logic gate circuit for producing the first delay signal from the detection signal and the third delay signal; and a second logic gate circuit for producing the second delay signal from the detection signal and the third delay signal.

12. A disk drive apparatus as claimed in claim 11, wherein the first and second delay signals are each a binary signal that is either at a first level or at a second level at a time, and wherein, when the first delay signal is at the first level, the first motor driver section is kept deactivated, and, when the second delay signal is at the first level, the second motor driver section is kept deactivated.

13. A disk drive apparatus as claimed in claim 12, wherein the detection signal and the third delay signal are each a binary signal that is either at a first level or at a second level at a time, and wherein, when the temperature inside the semiconductor integrated circuit device rises above the first temperature, the detection signal is switched from the second level to the first level, and, when the temperature inside the semiconductor integrated circuit device drops below the second temperature, the detection signal is switched from the first level to the second level.

14. A disk drive apparatus as claimed in claim 13, wherein the delay circuit comprises a plurality of stages of flip-flops, and wherein, when one of the detection signal and the third delay signal is at a high level, the first logic gate circuit keeps the first delay signal at the first level, and, when both of the detection signal and the third delay signal are at the first level, the second logic gate circuit keeps the first delay signal at the first level.

\* \* \* \* \*